United States Patent
Bailey et al.

(10) Patent No.: US 12,474,316 B2
(45) Date of Patent: Nov. 18, 2025

(54) MULTI-SENSE PLATFORM FOR IAQ HAZARD CLASSIFICATION

(71) Applicant: Kidde Fire Protection, LLC, Bradenton, FL (US)

(72) Inventors: Callum P. Bailey, Lakewood Ranch, FL (US); Rajiv Ranjan, Riverview, FL (US); Marcin Piech, East Hampton, CT (US); Peter J. McKinney, Boulder, CO (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 38 days.

(21) Appl. No.: 18/055,745

(22) Filed: Nov. 15, 2022

(65) Prior Publication Data

US 2023/0152291 A1    May 18, 2023

Related U.S. Application Data

(60) Provisional application No. 63/304,304, filed on Jan. 28, 2022, provisional application No. 63/264,217, filed on Nov. 17, 2021.

(51) Int. Cl.
*G01N 33/00* (2006.01)
*G08B 21/14* (2006.01)

(52) U.S. Cl.
CPC ......... *G01N 33/0075* (2013.01); *G08B 21/14* (2013.01)

(58) Field of Classification Search
CPC ......... G01N 33/0075; G01N 2223/638; G01N 2021/7756; G02B 2006/12138; G07F 15/001; G01R 33/0094
See application file for complete search history.

(56) References Cited

U.S. PATENT DOCUMENTS

| | | | |
|---|---|---|---|
| 4,670,405 A | 6/1987 | Stetter et al. |
| 5,731,510 A | 3/1998 | Jones et al. |
| 5,918,257 A | 6/1999 | Mifsud et al. |
| 6,085,576 A | 7/2000 | Sunshine et al. |
| 7,756,683 B2 | 7/2010 | Kilgus |
| 8,545,761 B2 | 10/2013 | Cox |
| 8,586,383 B2 | 11/2013 | Walte et al. |

(Continued)

FOREIGN PATENT DOCUMENTS

| CN | 105388259 A | 3/2016 |
| CN | 110274988 A | 9/2019 |

(Continued)

OTHER PUBLICATIONS

Extended European Search Report received for EP Application No. 22208170.5, mailed on Mar. 13, 2023, 08 Pages.

(Continued)

*Primary Examiner* — Curtis J King
(74) *Attorney, Agent, or Firm* — CANTOR COLBURN LLP

(57) ABSTRACT

A multi-sense platform is provided and includes a first sensor, a second sensor and a controller disposed in signal communication with the first sensor and the second sensor. The controller is configured to determine a presence of a first type of gas based on readings of the first sensor and to distinguish between a first one of the first type of gas and a second one of the first type of gas based on readings of the second sensor.

20 Claims, 4 Drawing Sheets

(56) References Cited

U.S. PATENT DOCUMENTS

| | | | |
|---|---|---|---|
| 9,074,731 B2 | 7/2015 | Barrett | |
| 9,823,211 B1 | 11/2017 | Allen | |
| 10,408,482 B2* | 9/2019 | Ro | F24F 11/58 |
| 10,775,068 B2* | 9/2020 | Lee | G06F 16/9038 |
| 10,935,531 B2 | 3/2021 | Spruce et al. | |
| 11,047,843 B2* | 6/2021 | Kim | G01N 33/0031 |
| 2013/0174646 A1* | 7/2013 | Martin | G01N 33/00 73/31.02 |
| 2015/0052975 A1* | 2/2015 | Martin | G01N 33/0075 73/31.02 |
| 2016/0334320 A1 | 11/2016 | Cho | |
| 2018/0149383 A1* | 5/2018 | Martin | F24F 11/30 |
| 2018/0321207 A1 | 11/2018 | Hellgren et al. | |
| 2019/0195818 A1* | 6/2019 | Brahem | G01N 33/0075 |
| 2019/0195845 A1* | 6/2019 | Kim | G01N 33/007 |
| 2020/0200724 A1 | 6/2020 | Sun et al. | |
| 2020/0355665 A1* | 11/2020 | Mazzola | G01N 33/0075 |
| 2021/0055272 A1* | 2/2021 | Cho | G01N 15/0205 |
| 2021/0072206 A1* | 3/2021 | Nigg | F24F 11/63 |
| 2021/0076328 A1* | 3/2021 | Nigg | F24F 11/39 |
| 2021/0131692 A1* | 5/2021 | Martin | G01N 33/0075 |
| 2021/0132018 A1 | 5/2021 | Jung et al. | |
| 2021/0140769 A1* | 5/2021 | Langland | G01N 33/0075 |
| 2022/0065834 A1* | 3/2022 | Gadot | G01N 33/0047 |
| 2023/0333074 A1* | 10/2023 | Martin | G01N 33/0075 |

FOREIGN PATENT DOCUMENTS

| | | |
|---|---|---|
| CN | 110596316 A | 12/2019 |
| CN | 111596013 A | 8/2020 |
| EP | 1439387 A1 | 7/2004 |
| GB | 2562275 A | 11/2018 |
| WO | 9532421 A1 | 11/1995 |
| WO | 2009011593 A1 | 1/2009 |
| WO | 2021011822 A1 | 1/2021 |

OTHER PUBLICATIONS

European Search Report for Application No. 22208170.5, Issued Sep. 17, 2024, 4 Pages.

\* cited by examiner

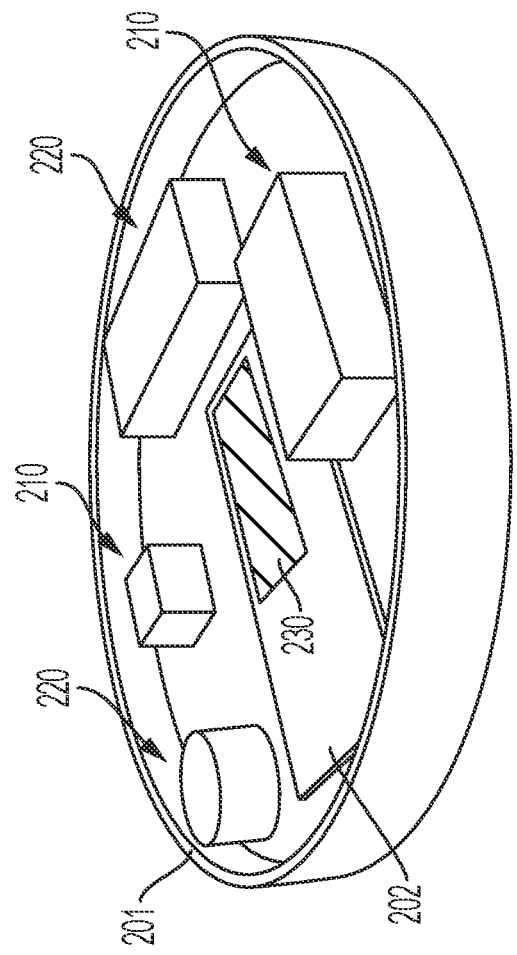
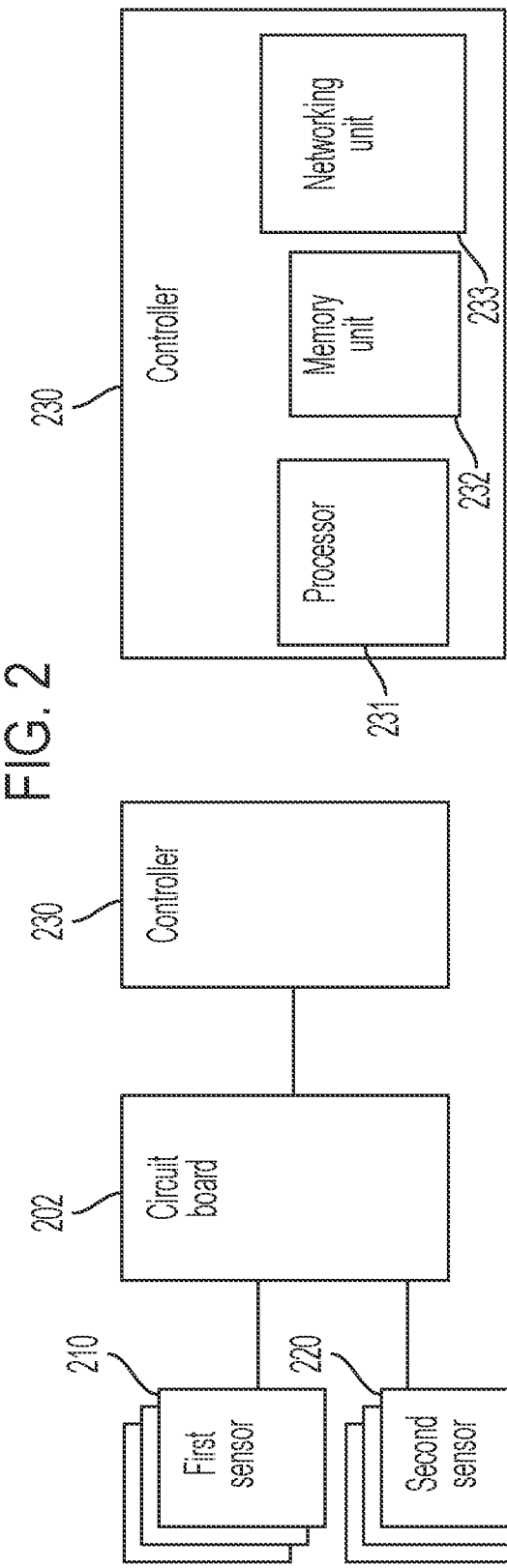
FIG. 2
FIG. 3
FIG. 4

MULTI-SENSE PLATFORM FOR IAQ HAZARD CLASSIFICATION

CROSS REFERENCE TO A RELATED APPLICATION

The application claims the benefit of U.S. Provisional Application No. 63/264,217 filed Nov. 17, 2021 and U.S. Provisional Application No. 63/304,304 filed Jan. 28, 2022, the contents of which are hereby incorporated in their entirety.

BACKGROUND

The present disclosure relates to sensor platforms and, more particularly, to a multi-sensor platform for indoor air quality (IAQ) hazard classification.

Air pollution is the presence of substances in the atmosphere that are harmful to the health of humans and other living beings, or cause damage to the climate or to building structures, interiors, and materials. There are many different types of air pollutants, such as gases (including ammonia, carbon monoxide, sulfur dioxide, nitric oxide, methane, carbon dioxide and chlorofluorocarbons), particulates (both organic and inorganic) and biological molecules. Air pollution may cause diseases, allergies and even death to humans; it may also cause harm to other living organisms such as animals and food crops, and may damage the natural environment (for example, due to climate change, ozone depletion or habitat degradation) or built environment (for example, acid rain). Both human activity and natural processes can generate air pollution.

BRIEF DESCRIPTION

According to an aspect of the disclosure, a multi-sense platform is provided and includes a first sensor, a second sensor and a controller disposed in signal communication with the first sensor and the second sensor. The controller is configured to determine a presence of a first type of gas based on readings of the first sensor and to distinguish between a first one of the first type of gas and a second one of the first type of gas based on readings of the second sensor.

In accordance with additional or alternative embodiments, the controller is embodied in one or more of the first and second sensors or is remote from the first and second sensors.

In accordance with additional or alternative embodiments, the controller generates a fingerprint of a species of interest in accordance with the readings of the first and second sensors.

In accordance with additional or alternative embodiments, the controller is further configured to issue a warning in an event either of the first and second ones of the first type of gas is hazardous and present and the warning includes a gas concentration indicator and a risk factor indicator.

In accordance with additional or alternative embodiments, the first sensor includes a metal-oxide semiconductor (MOS) sensor and the second sensor includes at least one of an electrochemical sensor and an infrared sensor.

In accordance with additional or alternative embodiments, the first type of gas includes a reducing gas and the first and second ones of the first type of gas are different reducing gases with similar reduction potential and similar bonding affinities to the MOS sensor.

In accordance with additional or alternative embodiments, the first sensor includes a particulate sensor and the second sensor includes at least one of a metal-oxide semiconductor (MOS) sensor, an electrochemical sensor and an infrared sensor.

In accordance with additional or alternative embodiments, the first type of gas includes particulates and the first and second ones of the first type of gas are gases with harmful and safe particulates, respectively.

According to an aspect of the disclosure, a multi-sense platform is provided and includes a frame, a circuit board supportively disposed in the frame, a first sensor operatively coupled to the circuit board and configured to detect a first type of gas and to generate readings indicative thereof, a second sensor operatively coupled to the circuit board and configured to detect first and second ones of the first type of gas and to generate readings indicative thereof and a controller disposed in signal communication with the first sensor and the second sensor. The controller is configured to determine a presence of the first type of gas based on the readings of the first sensor and to distinguish between the first and second ones of the first type of gas based on the readings of the second sensor.

In accordance with additional or alternative embodiments, the controller is embodied in the circuit board, in one or more of the first and second sensors or is remote from the first and second sensors.

In accordance with additional or alternative embodiments, the controller generates a fingerprint of a species of interest in accordance with the readings of the first and second sensors.

In accordance with additional or alternative embodiments, the controller is further configured to issue a warning in an event either of the first and second ones of the first type of gas is hazardous and present and the warning includes a gas concentration indicator and a risk factor indicator.

In accordance with additional or alternative embodiments, the first sensor includes a metal-oxide semiconductor (MOS) sensor and the second sensor includes at least one of an electrochemical sensor and an infrared sensor.

In accordance with additional or alternative embodiments, the first type of gas includes a reducing gas and the first and second ones of the first type of gas are different reducing gases with similar reduction potential and similar bonding affinities to the MOS sensor.

In accordance with additional or alternative embodiments, the first sensor includes a particulate sensor and the second sensor includes at least one of a metal-oxide semiconductor (MOS) sensor, an electrochemical sensor and an infrared sensor.

In accordance with additional or alternative embodiments, the first type of gas includes particulates and the first and second ones of the first type of gas are gases with harmful and safe particulates, respectively.

According to an aspect of the disclosure, a method of operation of a multi-sense platform is provided and includes detecting a first type of gas and generating readings indicative thereof at a first sensor, detecting first and second ones of the first type of gas and to generate readings indicative thereof at a second sensor, determining a presence of the first type of gas based on the readings of the first sensor and distinguishing between the first and second ones of the first type of gas based on the readings of the second sensor.

In accordance with additional or alternative embodiments, the method further includes generating a fingerprint of a species of interest in accordance with the readings of the first and second sensors.

In accordance with additional or alternative embodiments, the method further includes issuing a warning in an event either of the first and second ones of the first type of gas is hazardous and present.

In accordance with additional or alternative embodiments, the warning includes a gas concentration indicator and a risk factor indicator.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 2 is a perspective view of an exemplary structure of the multi-sense platform for IAQ hazard classification of FIG. 1 in accordance with exemplary embodiments;

FIG. 3 is a schematic diagram illustrating sensors and a controller of the multi-sense platform for IAQ hazard classification of FIG. 1 in accordance with exemplary embodiments;

FIG. 4 is a schematic diagram of the controller of FIG. 3 in accordance with exemplary embodiments;

DETAILED DESCRIPTION

In addition to inorganic gases, such as nitrogen, oxygen and carbon dioxide, air naturally contains low levels of aerosolized particulate matter (PM), as well as chemicals, such as volatile organic compounds (VOCs) and volatile sulfur compounds (VSCs). Within these classes are materials that are classified as hazardous air pollutants (HAPs), while other materials may be more benign or harmless.

Thus, as will be described below, a multi-sense platform is provided and features various sensors that can be used in combination to create a fingerprint of a species of interest. Using the sensors in combination with one another can overcome specificity limitations of the individual sensors in insolation. For example, a sensor formed of a metal-oxide semiconductor (MOS) can detect reducing gases, but will have difficulty distinguishing between two gases with similar reduction potential and similar bonding affinity to the sensor. However, use of one or more electrochemical sensors and/or IR sensors in combination with the MOS sensor could allow the gases to be distinguished and provide additional specificity to the sensing platform. Similarly, a particulate sensor could be used in conjunction with an MOS sensor, an electrochemical sensor or an infra-red (IR) sensor (i.e., a photo-electric scattering sensor or a near IR (NIR) emitter with a silicon photodiode sensor to measure a scattering of particles) to distinguish harmful particulate matter, such as wildfire smoke from water droplets in condensing steam. This information could be used to modify a hazard classification algorithm to reduce the hazard category when a benign component is identified.

Figure 1:
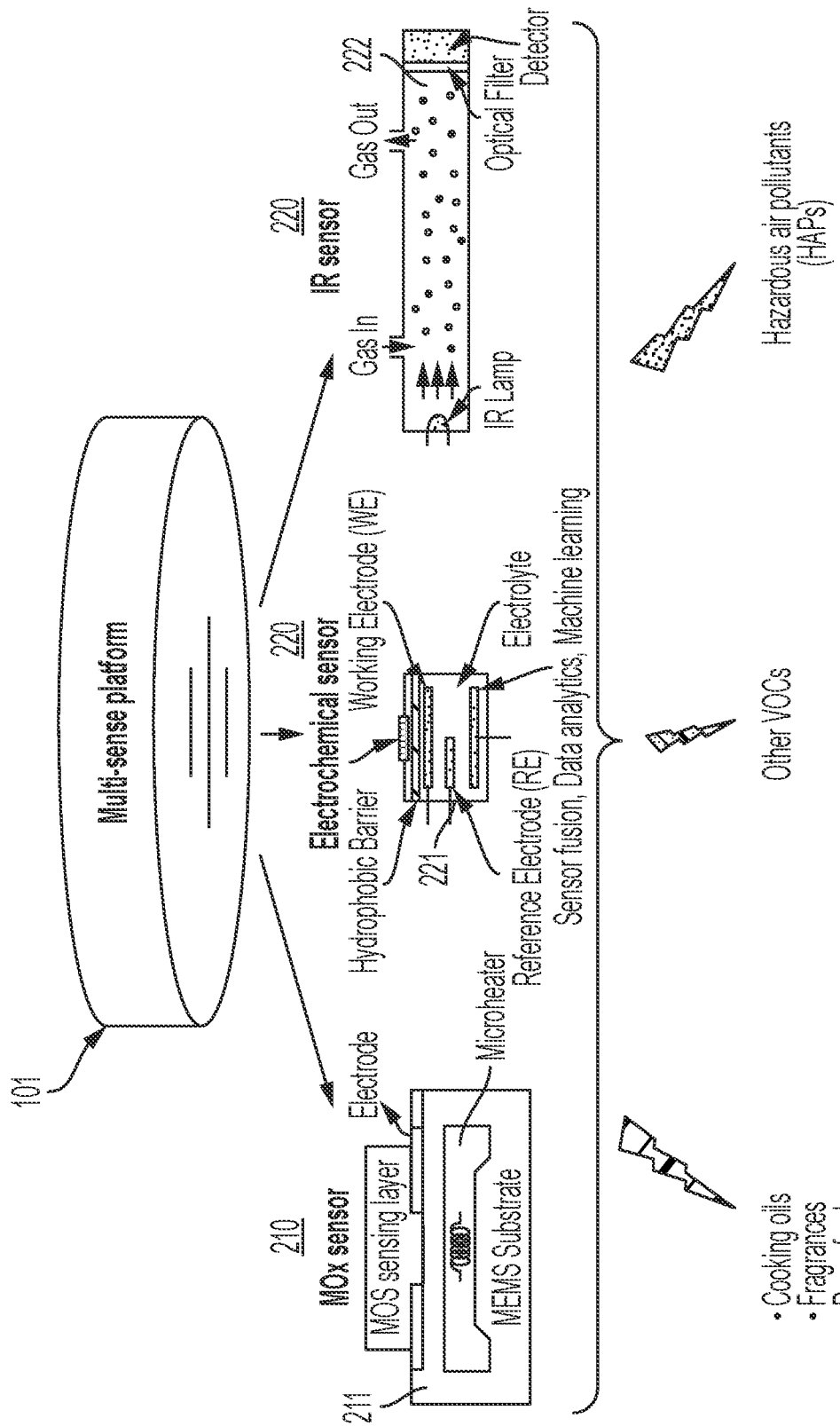
FIG. 1 is a schematic illustration of an exemplary multi-sense platform for indoor air quality (IAQ) hazard classification in accordance with exemplary embodiments.

With reference to FIGS. 1-3, a multi-sense platform 101 is provided and includes a frame 201, a circuit board 202 that is supportively disposed in the frame 201, at least one or more first sensors 210, at least one or more second sensors 220 and a controller 230 (see FIGS. 2 and 3). The at least one or more first sensors 210 are operatively coupled to the circuit board 202 and are configured to detect a first type of gas and to generate readings indicative thereof. The at least one or more second sensors 220 are operatively coupled to the circuit board 202 and configured to detect first and second ones of the first type of gas and to generate readings indicative thereof. In this way, if the one or more first sensors 210 are able to detect the first type of gas but are incapable of distinguishing between different ones of the first type of gas, the at least one or more second sensors 220 can be used to distinguish between the first and second ones of the first type of gas.

Although the multi-sense platform 101 can include at least one or more first sensors 210 and at least one or more second sensors 220, the following description will relate to the exemplary case in which the multi-sense platform 101 includes a first sensor 210 and a second sensor 220. This is being done for clarity and brevity and should not be interpreted as limiting of the instant disclosure or the claims in any way.

The controller 230 is disposed in signal communication with the first sensor 210 and with the second sensor 220. The controller 230 is configured to determine a presence of the first type of gas based on the readings of the first sensor 210 and to distinguish between the first and second ones of the first type of gas based on the readings of the second sensor 220. The controller 230 can be embodied in the circuit board 202. Alternatively, the controller 230 can be embodied in one or more of the first sensor 210 and the second sensor 220. In yet another embodiment, the controller 230 can be remote from the circuit board 202, from the first sensor 210 and from the second sensor 220. The embodiment of FIG. 2 illustrates that the controller 230 is embodied in the circuit board 202. This is done for clarity and should not be interpreted as limiting a scope of the description in any manner.

With reference to FIG. 4, the controller 230 can include a processor 231, such as a microprocessor or a central processing unit, a memory unit 232 and a networking unit 233 by which the processor 231 communicates with the circuit board 202, the first sensor 210 and the second sensor 220. The memory unit 232 has executable instructions stored thereon, which are readable and executable by the processor 231. When the executable instructions are read and executed by the processor 231, the executable instructions cause the processor 231 to operate substantially as described herein. For example, the processor 231 of the controller 230 can generate a fingerprint of a species of interest in accordance with the readings of the first and second sensors. In addition, the processor 231 of the controller 230 can be further configured to issue a warning in an event when either of the first and second detected gases is hazardous and present. The warning can include a gas concentration indicator and a risk factor indicator.

In accordance with exemplary embodiments, as shown in FIG. 1, the first sensor 210 can include a MOS sensor 211 or a particulate sensor (not shown) and the second sensor 220 can include at least one of a MOS sensor, an electrochemical sensor 221 and an infrared sensor 222. In these or other cases, the first type of gas can be a reducing gas that can be sensed by the MOS sensor 211, where the MOS sensor 211 is otherwise incapable of distinguishing between different reducing gases due to their having similar reduction potentials and similar bonding affinities to the MOS sensor. Here, the first and second ones of the first type of gas are different reducing gases with similar reduction potential and similar bonding affinities to the MOS sensor that can be distinguished from one another by at least one of the electrochemical sensor 221 and an infrared sensor 222. Alternatively, the first type of gas can be associated with presence of particulates, and the first and second ones of the first type of gas are gases associated with harmful and safe particulates, respectively.

As used herein, 'gas' can be classified as being molecular with a size of about <0.3 nm while particulate matter includes molecules with sizes of about >300 nm. Particulates may be generated in conjunction with certain types of gases. This is particularly true of fires whereby many toxic gases are emitted (carbon monoxide, carbon dioxide, nitrogen oxides, aldehydes, ketones, etc.) prior to or during combustion events that generate particulates. Similarly, cleaning (benign activity) will typically include generations of droplets and concurrent emissions of gas species such as ammonia, alcohols, acetone, etc.

In some cases, particles in particulate matter can be larger or smaller than 300 nm. It is, therefore, to be understood that particles in particulate matter can be any size and that the present description is not limited to any sensors (optical or otherwise) that are capable of sensing particles of particular size ranges.

In greater detail, the first sensor 210 and the second sensor 220 can include various combinations of photo-electric based smoke detector chambers, ion-based smoke detector chambers, radon detectors, polymeric temperature/humidity sensors, MOS sensors optimized for sensing reducing or oxidizing gases (ozone or nitrogen oxide, both considered HAP) and which are often marketed as being outdoor air quality sensors, photoionization detectors (PID) especially suitable for very low concentration HAP sensing, electrochemical sensors, non-dispersive infrared (NDIR) sensors or photo-acoustic (PA) infrared sensors, low-cost Raman spectroscopes and optical fiber sensors for VOCs.

In the case of the first sensor 210 or the second sensor 220 being a photo-electric based smoke detector chambers for sensing particulate matter (PM), the sensor can be provided as single-channel chambers or multi-channel chambers that employ multiple wavelengths of light including infrared and blue light and photodiodes at different positions to capture multiple angles of scattered light where a ratio between channels can provide information on particle size and shape. The sensor can also include additional ultra-violet channels (inclusive of additional LED, photodiode, and bandpass filter as necessary) to detect HAP aromatics (benzene, phenol, polycyclic aromatics) and potential biological fluorescence. The aromatics absorb ultraviolet (UV) light whereas most other non-biological VOCs do not. Aromatics are also a common fire component (wildfire smokes generated in California contain many prevalent HAP contaminants).

For MOS sensors optimized for sensing reducing gases, the reducing gases can be ethanol vapor, toluene vapor, formaldehyde, mercaptans, carbon monoxide and others. The MOS sensors can be those that are often marketed as indoor air quality (IAQ) or VOC sensors. These sensors can include different chemical dopants within the metal oxide structure to fine-tune selectivity and sensitivity of their response to different gases. Furthermore, these sensors feature a heater and can cycle through different temperature settings where the adsorbed gases will cause the sensor to have a different resistance at different temperatures. This correlation between temperature and resistance can also function as a fingerprint identification.

For electrochemical sensors, these sensors can include carbon monoxide (i.e., HAP) sensors, where an electrochemical catalyst may be optimized to react with a specific analyte or class of analytes of high concern, such as formaldehyde. An electrochemical sensor voltage bias may be optimized to detect a specific analyte or class of analytes of high concern, such as formaldehyde once again.

For NDIR sensors or photo-acoustic (PA) infrared sensors, these function by emitting infra-red light subsequently absorbed by gas molecules stimulated to bend, stretch and rotate. The light adsorption is detected by NDIR sensor photodiode or resulting acoustic signal detected by a PA sensor microphone. A narrow bandpass filter can be applied to the emitted IR light so that only molecules possessing the infrared moiety of interest will be stimulated and be detected. Hydroxyl band (—OH) occurring at 3400 cm-1 could be indicative of common low-hazard compounds such as: water, hydroxypropyl-β-cyclodextrin (used in odor eliminator air fresheners), propylene glycol (vaping), diethylene glycol (odor eliminator in cleaning products), ethyl alcohol (beverages) and isopropanol (hand sanitizer). Cross-sensitivities to hazardous substances sharing the same 3400 cm-1 band (phenols for example) can be detected and accounted for by other sensors on the platform. In the same manner, aromatic compounds could be detected by UV adsorption, while ammonia can be detected with a metal oxide sensor.

Figure 5:
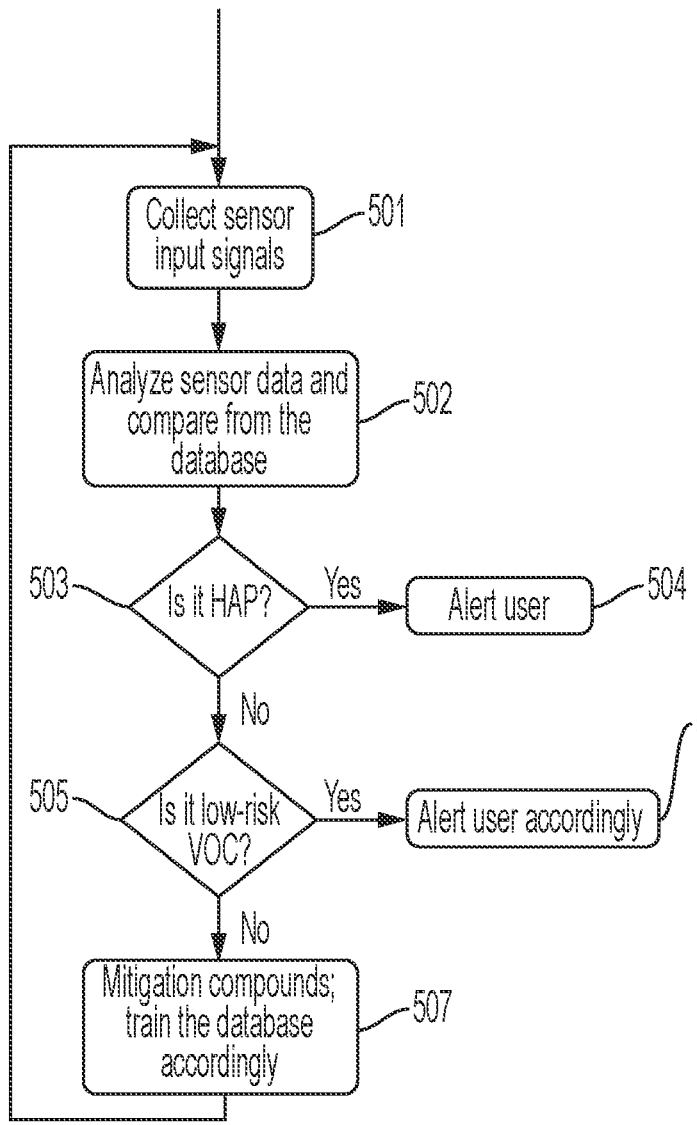
FIG. 5 is a flow diagram illustrating a normal operation mode of the multi-sense platform for IAQ hazard classification of FIG. 1 in accordance with exemplary embodiments.
Figure 6:
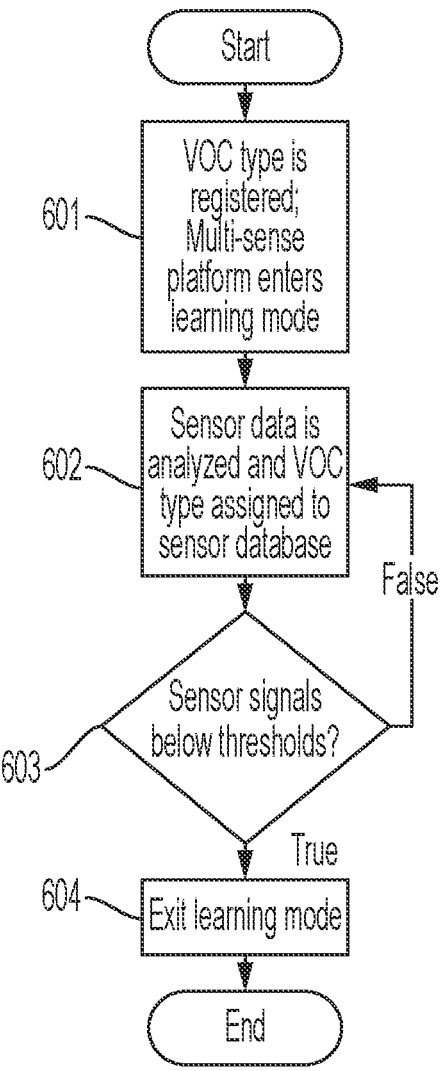
FIG. 6 is a flow diagram illustrating a learning mode of the multi-sense platform for IAQ hazard classification of FIG. 1 in accordance with exemplary embodiments.

With reference to FIGS. 5 and 6 and in accordance with further exemplary embodiments, a residential user can place the multi-sense platform 101 in a normal operational mode (see FIG. 5) or in a training-mode (see FIG. 6).

In the former case, as shown in FIG. 5, sensor input signals are collected (block 501) and sensor data is analyzed and compared with a database (block 502). An HAP determination is then made (block 503) and followed up with an alert (block 504) and, if a detected chemical is not an HAP, a determination is made as to whether a chemical is a low-risk VOC (block 505) which is followed by an alert (block 506). If the detected chemical is not a low-risk VOC, the database is updated accordingly (block 507) and control reverts to block 501. In the latter case, as shown in FIG. 6, the training mode can be engaged where PM or VOC sources of low-concern can be introduced to the multi-sense platform 101 and identified as low-risk sources.

In the training mode, a VOC type is registered (block 601), sensor data is analyzed and the VOC type is assigned to the database (block 602). At this point, a determination is made as to whether sensor signals are below a threshold based on sensor sensitivity limits or gas concentrations (block 603). If not, control reverts to block 602. If so, learning mode is exited (block 604). Thus, upon future exposure to a source, the multi-sense platform 101 would show a reduced risk response. Data uploaded to the database will be available for cross-referencing with other user-reported low risk sources and given sufficient independent validation it could be added to the general population of low-risk fingerprint profiles.

In summary, the multi-sense platform 101 described above makes use of targeted sensors to detect classes of chemicals (e.g., an IR sensor for a hydroxyl group and/or a UV sensor to detect aromatics) and makes use of targeted sensors to detect specific chemicals of interest (e.g., electrochemical sensor for CO and formaldehyde). The multi-sense platform 101 also makes use of combinations of sensors to fingerprint identify other specific chemicals of interest. These can include, but are not limited to, phenols which respond to UV, reducing gases sensed with MOX, IR 3400 cm-1, benzene which responds to UV, reducing gas MOX, ammonia which responds to IR 3400 cm-1, reducing gas MOX that is a different MOX fingerprint from VOCs, water that registers with IR 3400 cm-1 and/or smoke chamber/particulate sensors depending on droplet size. In addition, the multi-sense platform makes use of combinations of sensors to fingerprint identify and categorize unknown chemicals to certain classes including: potential HAPs, uncategorized VOCs and low-risk VOCs. A raw response of a primary VOC sensor or a quantified VOC concentration can then be multiplied by a risk factor. For example, a potential HAPs could use a risk factor>1, uncategorized VOCs—risk factor=1 and low-risk VOCs—risk factor<1. A final VOC risk score can then be reported to a customer as a combination of VOC concentration and risk factor of constituent VOC classes.

Figure 7:
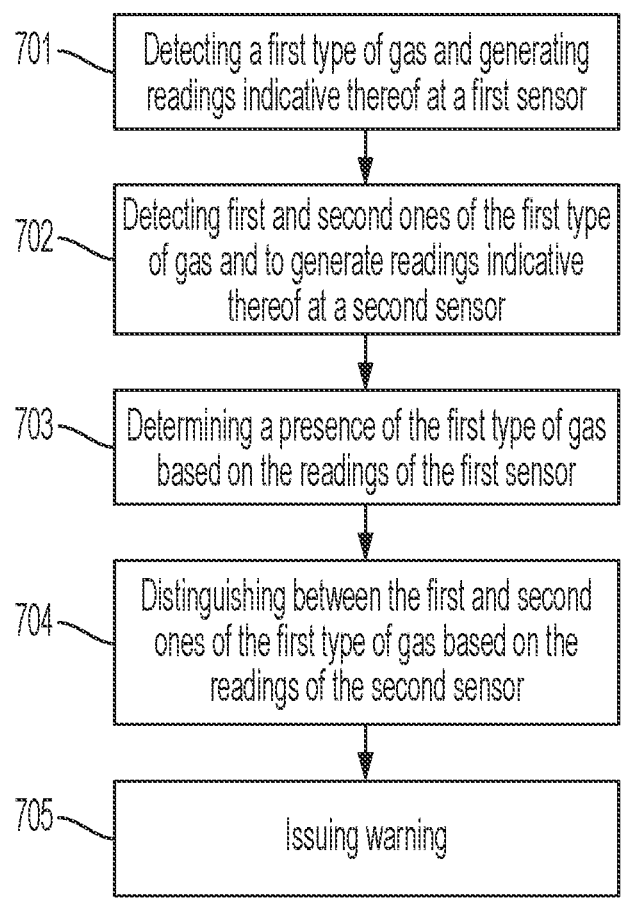
FIG. 7 is a flow diagram illustrating a method of operation of a multi-sense platform in accordance with exemplary embodiments.

With reference to FIG. 7, a method of operation of a multi-sense platform, such as the multi-sense platform 101, is provided. As shown in FIG. 7, the method includes detecting a first type of gas and generating readings indicative thereof at a first sensor (block 701), detecting first and second ones of the first type of gas and to generate readings indicative thereof at a second sensor (block 702), determining a presence of the first type of gas based on the readings of the first sensor (block 703) and distinguishing between the first and second ones of the first type of gas based on the readings of the second sensor (block 704). As explained above, this method can lead to the generating of a fingerprint of a species of interest in accordance with the readings of the first and second sensors. The method can also include issuing a warning in an event either of the first and second ones of the first type of gas is hazardous and present (block 705), where the warning can include a gas concentration indicator and a risk factor indicator.

Technical effects and benefits of the present disclosure are the provision of a multi-sense platform with an ability to distinguish HAPs from less harmful substances. This can provide more useful and actionable information to an end user that what is normally available from conventional sensor platforms that do not offer multiple, varied sensor types. In addition, the multi-sense platform would enable distinctions between "actual" IAQ events and false alarms due to room fresheners and other similar compositions that may be found in a given space whose ingredients are considered benign.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A multi-sense platform, comprising:
   a first sensor;
   a second sensor; and
   a controller disposed in signal communication with the first sensor and the second sensor,
   the controller being configured to;
      using a combination of readings from the first sensor and the second sensor to determine a presence of a first type of gas based on readings of the first sensor and to distinguish between a first one of the first type of gas and a second one of the first type of gas based on readings of the second sensor, wherein readings of the first sensor cannot distinguished between the first one of the first type of gas and the second one of the first type of gas; and
      categorize unknown chemicals as one or more of potential hazardous air pollutants (HAPs), uncategorized volatile organic compounds (VOCs), and low-risk VOCs.

2. The multi-sense platform according to claim 1, wherein the controller is embodied in one or more of the first and second sensors or is remote from the first and second sensors.

3. The multi-sense platform according to claim 1, wherein the controller generates a fingerprint of a species of interest in accordance with the readings of the first and second sensors.

4. The multi-sense platform according to claim 1, wherein:
   the controller is further configured to issue a warning in an event either of the first and second ones of the first type of gas is hazardous and present, and
   the warning comprises a gas concentration indicator and a risk factor indicator.

5. The multi-sense platform according to claim 1, wherein:
   the first sensor comprises a metal-oxide semiconductor (MOS) sensor, and
   the second sensor comprises at least one of an electrochemical sensor and an infrared sensor.

6. The multi-sense platform according to claim 5, wherein:
   the first type of gas comprises a reducing gas, and
   the first and second ones of the first type of gas are different reducing gases with similar reduction potential and similar bonding affinities to the MOS sensor.

7. The multi-sense platform according to claim 1, wherein:
   the first sensor comprises a particulate sensor, and the second sensor comprises at least one of a metal-oxide semiconductor (MOS) sensor, an electrochemical sensor and an infrared sensor.

8. The multi-sense platform according to claim 7, wherein:
the first type of gas comprises particulates, and
the first and second ones of the first type of gas are gases with harmful and safe particulates, respectively.

9. A multi-sense platform, comprising:
a frame;
a circuit board supportively disposed in the frame;
a first sensor operatively coupled to the circuit board and configured to detect a first type of gas and to generate readings indicative thereof;
a second sensor operatively coupled to the circuit board and configured to detect first and second ones of the first type of gas and to generate readings indicative thereof; and
a controller disposed in signal communication with the first sensor and the second sensor,
the controller being configured to:
use a combination of readings from the first sensor and the second sensor to determine a presence of the first type of gas based on the readings of the first sensor and to distinguish between the first and second ones of the first type of gas based on the readings of the second sensor, wherein readings of the first sensor cannot distinguish between the first one of the first type of gas and the second one of the first type of gas; and
categorize unknown chemicals as one or more of potential hazardous air pollutants (HAPs), uncategorized volatile organic compounds (VOCs), and low-risk VOCs.

10. The multi-sense platform according to claim 9, wherein the controller is embodied in the circuit board, in one or more of the first and second sensors or is remote from the first and second sensors.

11. The multi-sense platform according to claim 9, wherein the controller generates a fingerprint of a species of interest in accordance with the readings of the first and second sensors.

12. The multi-sense platform according to claim 9, wherein:
the controller is further configured to issue a warning in an event either of the first and second ones of the first type of gas is hazardous and present, and
the warning comprises a gas concentration indicator and a risk factor indicator.

13. The multi-sense platform according to claim 9, wherein:
the first sensor comprises a metal-oxide semiconductor (MOS) sensor, and
the second sensor comprises at least one of an electrochemical sensor and an infrared sensor.

14. The multi-sense platform according to claim 13, wherein:
the first type of gas comprises a reducing gas, and
the first and second ones of the first type of gas are different reducing gases with similar reduction potential and similar bonding affinities to the MOS sensor.

15. The multi-sense platform according to claim 9, wherein:
the first sensor comprises a particulate sensor, and
the second sensor comprises at least one of a metal-oxide semiconductor (MOS) sensor, an electrochemical sensor and an infrared sensor.

16. The multi-sense platform according to claim 15, wherein:
the first type of gas comprises particulates, and
the first and second ones of the first type of gas are gases with harmful and safe particulates, respectively.

17. A method of operation of a multi-sense platform, the method comprising:
detecting a first type of gas and generating readings indicative thereof at a first sensor;
detecting first and second ones of the first type of gas and to generate readings indicative thereof at a second sensor;
determining a presence of the first type of gas based on the readings of the first sensor;
using a combination of readings from the first sensor and the second sensor, distinguishing between the first and second ones of the first type of gas based on the readings of the second sensor, wherein readings of the first sensor cannot distinguish between the first one of the first type of gas and the second one of the first type of gas; and
categorizing unknown chemicals as one or more of potential hazardous air pollutants (HAPs), uncategorized volatile organic compounds (VOCs), and low-risk VOCs.

18. The method according to claim 17, generating a fingerprint of a species of interest in accordance with the readings of the first and second sensors.

19. The method according to claim 17, further comprising issuing a warning in an event either of the first and second ones of the first type of gas is hazardous and present.

20. The method according to claim 19, wherein the warning comprises a gas concentration indicator and a risk factor indicator.

* * * * *